Figure 1:
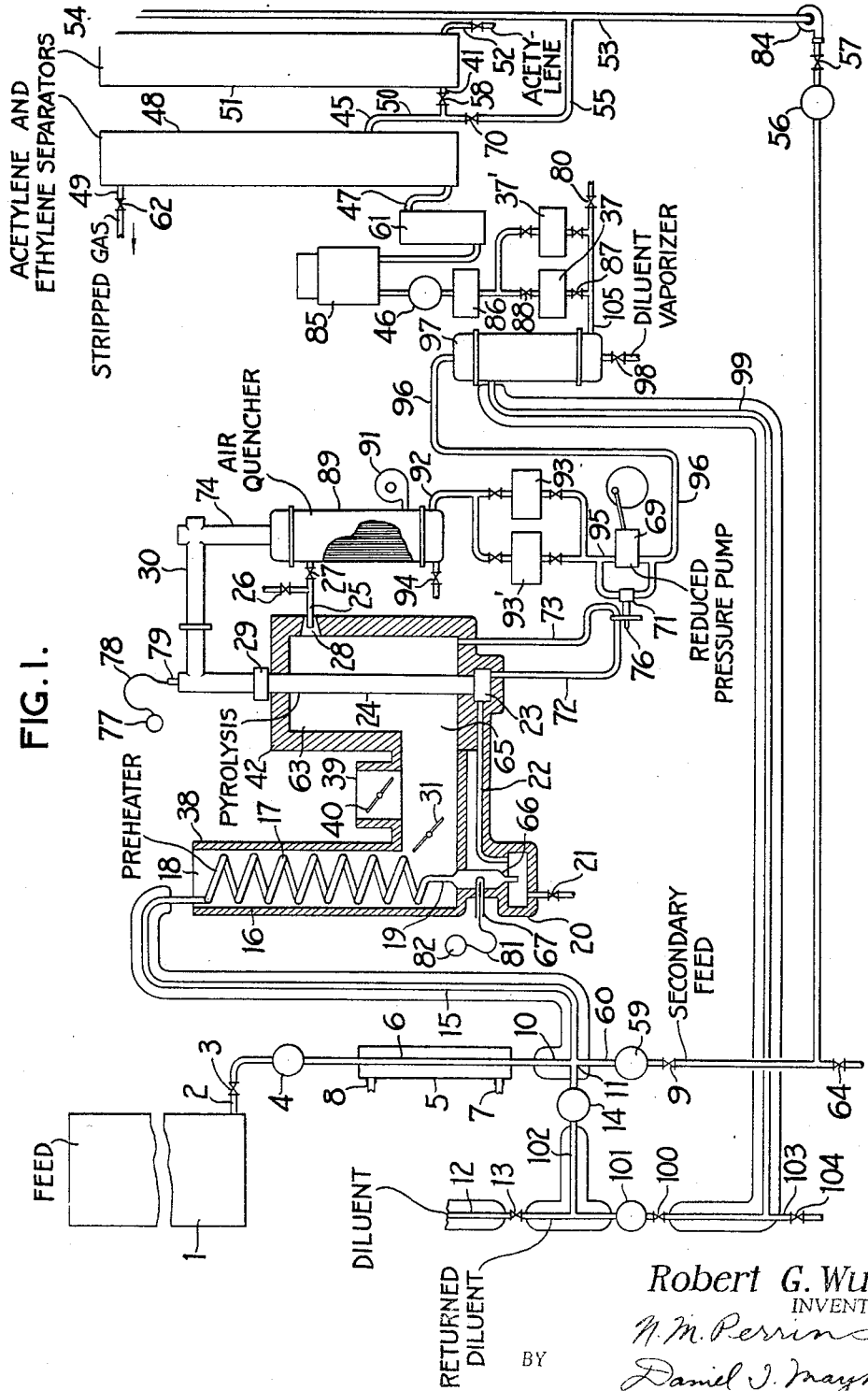

April 1, 1941. R. G. WULFF 2,236,555
MANUFACTURE OF ACETYLENE UNDER MODIFIED PRESSURE
AND TEMPERATURE CONDITIONS
Filed July 10, 1937 2 Sheets-Sheet 1

Robert G. Wulff
INVENTOR.

BY
ATTORNEYS

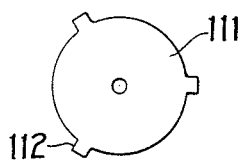
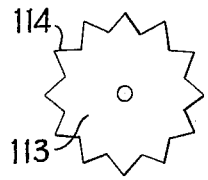
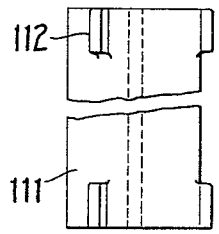
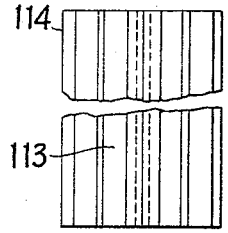
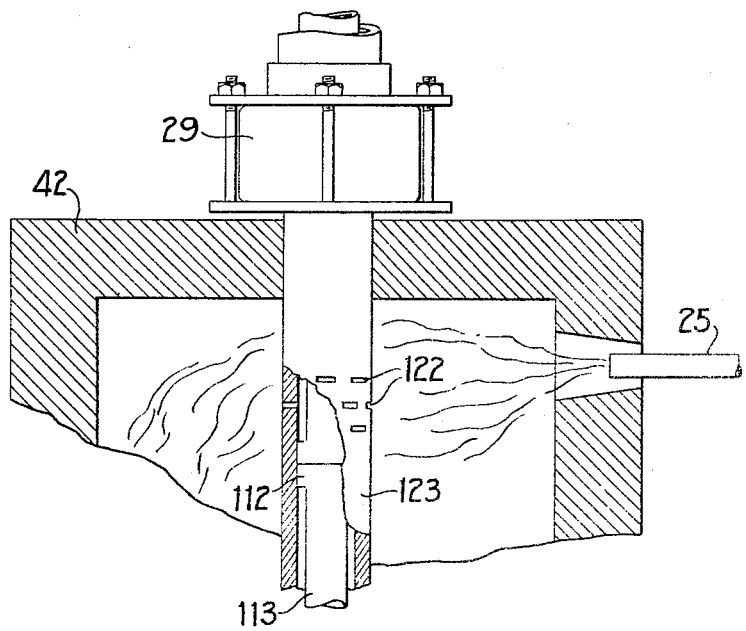

Patented Apr. 1, 1941

2,236,555

UNITED STATES PATENT OFFICE 2,236,555

MANUFACTURE OF ACETYLENE UNDER MODIFIED PRESSURE AND TEMPERATURE CONDITIONS

Robert G. Wulff, Kingsport, Tenn., assignor, by mesne assignments, to Wulff Process Company, Los Angeles, Calif., a corporation of California Application July 10, 1937, Serial No. 152,988

6 Claims. (Cl. 260—679)

This invention relates to a pyrolysis process for the manufacture of acetylene and more particularly to a pyrolysis process conducted under modified pressure and temperature conditions.

In certain of my prior patents such as, for example, Wulff Patents 1,880,308 and 1,880,309, I have shown pyrolysis processes for the manufacture of acetylene which are operated under various pressure and temperature conditions including reduced pressure. In these patents are also shown a large number of hydrocarbons which may be converted to acetylene, various diluents which may be employed, temperatures, periods of time for carrying out the reaction, and other details. My present process as set forth in the instant application is similar in some of these respects as for example, the same type of hydrocarbons may be treated, the same diluents may be employed, hence, a brief discussion of these factors is set forth herein. However, as the description proceeds, it will be apparent that the subject matter of the present application constitutes an improved and modified process over those described in my prior patents or in the prior art.

I have found a novel method for the manufacture of acetylene by the pyrolysis of various hydrocarbons in pyrolysis zones wherein the pressure and heating conditions may be modified considerably from those heretofore employed.

This invention has for one object to provide a pyrolysis process for the production of acetylene under reduced pressure conditions. Still another object is to provide a process for the manufacture of acetylene employing smaller quantities of diluent than formerly thought required. Still another object is to provide a pyrolysis process for the manufacture of acetylene in which a more costly diluent may be economically employed. Still another object is to provide a pyrolysis process for the production of acetylene wherein less fuel is required for furnishing the heating requirements. Another object is to provide a pyrolysis process in which there may be more or less direct heating. Still another object is to provide a pyrolysis process for the manufacture of acetylene in which the residence period during the pyrolysis treatment has been reduced to a very small time interval. A still further object is to provide a modified temperature and pressure pyrolysis process which may employ recirculation. Another object is to provide a pyrolysis process for the manufacture of acetylene in which substantial amounts of other unsaturated hydrocarbons may be produced along with the acetylene. Other objects will appear hereinafter.

For a more complete understanding of my invention, reference is made to the attached drawings in which Fig. 1 is a semi-diagrammatic side elevation view in the nature of a flow sheet showing one apparatus arrangement suitable for carrying out my process. Figs. 3 and 5 are semi-diagrammatic side elevation views of corebusters which may be employed in conjunction with my cracking equipment. Figs. 2 and 4 are end views respectively, of the aforementioned corebusters. Fig. 6 is a semi-diagrammatic side elevation view in which certain parts are broken away for clarity, showing in detail a modified form of cracking tube which I may employ.

In Fig. 1, the primary stock to be used in making acetylene and other products, is supplied from the container 1. Force required for putting it in flow may be available from the natural pressure of stock in the container 1, or from superposed gaseous pressure (not shown) above the liquid therein, or by any other suitable means (not shown), such as by introducing a pump into the line 2. In the line 2 is a valve 3 for regulating the rate of flow. Following valve 3 is a flow meter 4, followed in turn by a heater 5. The said heater may be put in use if the primary stock tends to condense. This heater 5 may operate in the conventional manner by admitting at 7 a heating medium about the tube 6. At the pipe juncture 11 the primary stock joins with diluent furnished under pressure through the pipe 12, preferably in superheated vapor form. Valve 13 serves to adjust the rate of flow of the diluent, and 14 is a flow meter in the line. Other pipes also make communication with the joint of juncture 11 for admitting secondary stock in a manner to be described.

Raw material and diluent become intimately mixed in the pipe 15 which carries the feed to the preheater 16. This preheater comprises a housing 38 and a heating coil 17 that receives the feed from pipe 15. The heating medium for the feed in coil 17 is flue gas preferably in countercurrent, coming from the cracking furnace 42 operating in conjunction. Flue gases forming in the combustion chamber 63 of the said furnace, pass into a duct 65, and may be divided into two streams by manipulation of the two dampers 31 and 40, which therefore serve as means for controlling the degree of preheat for the feed in coil 17. From the coil 17 the feed passes into the pipe 19, in which there may be a reaction chamber as at 66. Integral therewith may be a thermocouple well 67, where the degree of preheat of the feed may be determined by the thermocouple 81 indicating at the pyrometer 82. If a reaction chamber is not desired then the thermocouple well is integral with the pipe 19 which leads directly to the trap 20. The purpose of this trap is to catch any oils and tars that may form from the feed at times due to the action of the preheater 16. Any accumulation in trap 20 may be drained at will through valve 21. The fact that such products may form from the feed indicates that the preheater may bring about a chemical change in the constitution of the said feed. It may be affirmed at this point that though the feed changes in composition before reaching the cracking tube, it will still be referred to herein as feed.

Feed that does not condense in the trap 20, continues through pipe 22, and enters the cracking tube 24 through a fitting 23. The cracking tube 24 is heated by one or more burners as at 25, supplied with fuel and air respectively, through valves 26 and 27 for regulating the degree of temperature in the said cracking tube. Preferably there are at least two such burners, disposed to give the most uniform possible heating of the said tube. Cracked mixture leaves the tube 24, passes through a fitting 29, and enters pipes 30 and 74, which convey it to the device 89. The said pipes 30 and 74 are preferably water-jacketed or otherwise cooled, while in fact both fittings 23 and 29 are of artificially-cooled design for the protection thereof, as well as cooling in the case of 29. 79 indicates a point of entry for a thermo-couple 78 used for testing at different levels within the tube 24, temperatures indicated on the pyrometer 77. It is to be understood, however, that such instruments may be otherwise positioned.

89 indicates a heat exchanger for preheating burner air supplied from the blower 91. Heat is supplied by the cracked mixture entering through pipe 74 to be chilled. Preferably, however, it is not chilled to a point that condenses the diluent, but approximately to the normal boiling point of the latter. The cracked mixture then leaves the heater 89 at the point 92 to pass through one of two filters 93, 93' which operate alternately, for removal of carbon dust and other possible grit, as well as any condensing vapors of oil or asphalt.

Filtered cracked mixture then enters pipe 95 which conveys it to the intake of pump 69, which raises its pressure from the particular pressure of operation to approximately atmospheric. 71 is a valve for by-passing part of the discharge of pump 69. The valve 71 may be operated by pressure changes in either chamber 23 or 63, communicating through pipes 72 and 73, respectively. The purpose of this valve is to assist in maintaining the desired pressure in the chamber 23 and the cracking tube attached thereto. Adjustment may be made of the stud 76 on the by-pass valve 71 so as to hold the desired pressure in the chamber 23. Valve 71 performs this function by either increasing or relieving suction on the pump 69 through the by-pass line in which it operates. It is apparent that if the suction exerted by the pump 69 is increased, then a lower pressure would be produced in the conduits 74, 30, 29, thereby producing a considerably reduced pressure in pyrolysis tube 24. This degree of reduced pressure, of course, acts through conduit 72 upon the valve 71. Hence, if reduced pressure in the tube 24 changes, this automatically affects valve 71 and causes the re-attainment of the desired reduced pressure conditions.

The discharge through conduit 96 then enters a boiler 97 in which the diluent condenses, to be drawn off through a valve 98. Diluent vapor generated in the said boiler by the latent heat from condensing diluent in the cracked mixture, may carry a pressure substantially less than atmospheric in order to provide a temperature differential with which to operate the boiler 97, so long as the said diluent pressure exceeds appreciably that of the system where it enters for mixing with the raw material of the process. Diluent so formed leaves the boiler 97 through the line 99, and passes through a valve 100 and a meter 101, by which its rate of flow may be controlled. Then it enters the pipe 102 which is the diluent supply line ordinarily fed by the pipe 12 through the valve 13. In the line 99 is provided a T connection 103 and a valve 104 for diverting diluent from the boiler 97 to any other desired use.

Cracked gas which has been relieved of its condensable diluent in the boiler 97, leaves the said boiler through the pipe 105 to pass through one of two filters 37, 37' that may operate alternately. After filtering, the cracked gas enters an oil scrubber 86, which removes from the gas traces of the same kinds of deposits caught by the filters 37 and 37'. Said scrubber is not detailed, but may circulate an oil, such as straw oil or the like, that makes intimate contact with the gas in a conventional manner and takes to itself further heavy impurities contained in the cracked gas. The treated cracked gas then may pass through a meter 46, gas holder 85 and then preferably through a drier 61, for removing traces of any diluent which may not have been eliminated in devices 89 and 97.

After drying, the cracked gas enters tower 48 at a point 47 where is removed from the gas, preferably, the acetylene, plus ethylene content in substantially pure form. Stripped gas then makes exit from tower 48 at a point 49, while the acetylene plus ethylene leaves the tower at a point 45, and through pipe 50 enters tower 51 at a point 41. Here are separated the two gases, acetylene leaving the said tower at a point 52. From the point 54 the ethylene enters pipe 53, and passes through pump 84 and meter 56.

If tower 48, instead of removing from the cracked gas acetylene plus ethylene, removes only ethylene, it is then obvious that the gas leaving the point 49 of the tower 48 will include the acetylene produced, and will therefore be handled for utilization of the said acetylene in ways known to the art. Then ethylene alone will issue from the point 45 of the tower 48, and it need not go through tower 51. Instead, it is allowed to go through pipe 55 so as to enter pipe 53 and be handled as though it had passed through tower 51.

It should be repeated that Fig. 1 does not show each of the units of the process in its exact form, but diagrammatically only for purposes sufficient to full disclosure of my invention. More particularly is this true of the towers 48 and 51, which largely indicate the points at which it is preferred to apply known principles to accomplish the separations desired. Thus it follows also that besides ethylene, any other suitable raw materials to be found in the cracked gas may be extracted according to known art, and used as secondary stock or otherwise, in my process.

After the secondary stock has passed through meter 56, it may be allowed to pass through valve 64 for any use as known to the art or it may be saved in a gas holder for use later as a primary stock in my process. I prefer, however, to circulate some or all of it as secondary stock, allowing it therefore to pass through valve 9 and the meter 59, so that it may enter pipe 60 which communicates with the point of juncture where is mixed the original primary stock with its diluent. In the case of such recirculation, then, necessarily the raw material to be cracked consists of primary and secondary stock, mixed in the proportion as indicated on the meters 4 and 59. It is clear that each of the said stocks at will may be analyzed so as to determine, in connection with the meter readings, the exact composition of the raw material resulting from them.

Thus it is obvious from Fig. 1 that with the valves provided, it is possible to control the kind of diluent as well as its rate of flow, rate of flow of primary and secondary stocks, and rate of flow of fuel and preheated air which together determine furnace heating conditions. With the pump regulator 71, in turn, it is possible to set the pressure in the cracking tube 24 at various values.

Reference is now made to Figs. 2–5, inclusive. In these figures are shown corebusters which may be inserted in the pyrolysis tube 24. Such devices reduce the cross-section of the tube, thereby facilitating heat transfer, causing increased velocity of materials fed through the tube and other advantages. In Fig. 2, the particular construction 111 may be substantially cylindrical in form and have positioned at various points lugs 112 for centering the corebusters within tube 24. These lugs are more clearly shown in Fig. 3. Or, if desired, the construction of the corebuster may be of the irregular formation, as shown at 113, namely, star-shaped as more clearly shown in Fig. 4. The projections 114 would likewise serve for centering the device. These corebusters may be arranged within the tube for providing a uniform cross-section but I also find that a non-constant cross-section has certain advantages, as will be pointed out in more detail hereinafter. While I have shown and described the feature of non-constant cross-section in my reduced pressure process, it is also possible to use this feature of non-uniformity in pyrolysis processes operating at normal pressure.

These corebuster constructions cooperate with either or both the preheaters or cracking tubes for producing a definite area ratio.

Ratio of surface to volume will be expressed in square feet per cubic foot. For instance, in a preheater tube of 1.75 inches internal diameter, without corebuster, the said ratio is $$\frac{48.}{1.75} = 27.4$$

If a corebuster is present, the sum of the internal areas exposed to the stream, is divided by the net volume bounded by said areas. If the corebuster is cylindrical, the volume is then annular. If the outer surface of the corebuster has a special shape, the area of that surface is estimated for use as above.

Ratio of area to volume, hereinafter to be termed area ratio, in the preheater tube may range from as much as 600. to as little as 27. I prefer to use an area ratio below 300. and particularly in the region of 25 to 100. I have found that the range permissible here is very wide, since it may be compensated not only with temperature, but also with residence period, which my reduced pressure decreases. For the higher the area ratio, the more rapidly the gas will absorb heat, and the less severe the temperature need be, or the less the period of heating.

Fig. 6 shows a modified construction for obtaining a more direct heating in pyrolysis operation to be described hereinafter. In this construction a modified form of tube is contained in the furnace 42. As in Fig. 1, this modified tube 123 may extend through the furnace walls and is attached to fitting 29 as already described. The tube may contain therein a corebuster 113. In the upper portion of the tube is placed a number of perforations 122. Otherwise, the construction is more or less the same as the construction of tube 24. The functioning of this modified arrangement will be described in detail hereinafter.

For the purposes of illustration, a general description of the operation of my process is now set forth. Any of the various hydrocarbons described in my prior patents or other materials which are capable of being converted to acetylene and other unsaturated products may be fed from the feed container 1 to the various conduits shown in Fig. 1 to the preheater. In my process the feed may, if desired, be cracked to maximum acetylene but preferably I operate my reduced pressure process to produce not only acetylene, but ethylene. That is, I operate my reduced pressure process so that the pyrolysis products obtained therefrom contain a high aggregate yield of acetylene and olefines.

To this end, preferably steam or other diluent as well as secondary stock are fed in so that they arrive at the junction 11 and are conveyed to the preheater along with the first-mentioned feed. The various materials may be preheated, usually at a temperature less than 1100° C. and above about 600° C. or 700° C., depending upon the dilution, particular materials, and other factors which will be apparent as the description proceeds. The preheated materials are then conducted through conduit 22 into the cracking tube 24 where my distinct reduced pressure treatment takes place.

In addition to preheating, there are several other preliminary features which may be applied in my process for the manufacture of acetylene. It is understood, however, that these various steps to be described, while preferred, are to some extent optional. Hence, one or more or a combination of the following features may be utilized.

If the feed materials, such as my primary or secondary stock, contain appreciable portions of sulphur in the form of hydrogen sulphide or other volatile sulphur compounds such as light mercaptans or organic sulphides, the yield of acetylene as well as ethylene or other olefines is diminished thereby.

Therefore, the net result of the presence of sulphur and particularly too great a content of sulphur in the materials to be pyrolized, is to reduce yields. It is therefore a part of my invention to provide against this difficulty, inasmuch as a great amount of raw material containing sulphur is available for use. It is, of course, possible to remove sulphur from the stock before subjecting it to treatment. There are a number of processes known for removing sulphur and I may apply any one of these processes to my stock before conducting it through the apparatus.

However, it is possible to use such a stock which contains sulphur by my process. Sulphur in conjunction with steam is a factor tending to destroy the acetylene and ethylene which I wish to produce, by forming carbon monoxide from them. Hence, I disclose the utility of operating with reduced pressure and less steam in the presence of sulphur. It is desired to bring out that this feature has considerable utility because of the availability of large quantities of sulphur-containing gases which may be treated by my process.

Referring again to the preheater construction, it is preferred to use iron or steel or any of the various heat-resisting alloy steels such as chromium steels, chrome aluminum, chrome molybdenum or chrome tungsten steels. However, there are various other heat-resisting alloys such as chrome nickel alloys, chrome nickel steels and the like. In operating my process in some instances such as with previously constructed apparatus, the occasion may arise wherein the preheater tubes are constructed of materials containing more or less nickel. I have found in such instances that improved operation may be obtained by using less steam as a diluent, substituting therefor, a certain measure of reduced pressure. Under some conditions I may also elect to use preheater apparatus containing a moderate content of nickel together with less steam and a measure of reduced pressure.

I shall herewith present some of the advantages of operating under reduced pressure after the manner of Fig. 1, which have not yet appeared. I find it possible to make production considerably cheaper. With air preheated by the cracked mixture, I make an appreciable saving, as well as obtain other advantages from this step. Further, how I avoid using a water spray for chilling cracked mixture and substitute the preheater 89 without sacrificing yield of acetylene and ethylene, also will be explained.

If the diluent is steam, then the preheater 89 is adapted to cool the cracked mixture to about 100° C. At this temperature considerable oil and asphalt will condense in the said heater, which will drain so as to be removed at will through the valve 94. If the diluent is a high-boiling one such as mercury, the operating temperature of the preheater is set higher, and much less oil condenses therein.

In any case, the pump 69 raises the pressure of the cracked mixture so that it may enter the boiler 97, and supply the heat for making more diluent vapor. In effect, the said boiler transfers latent heat from diluent in the cracked mixture, to fresh diluent, thus eliminating the need of fuel to form that diluent vapor required. As stated before, the boiler 97 operates in virtue of the fact that condensation is taking place at a higher pressure, therefore, a higher temperature, than evaporation. Thus there is a temperature differential for operating.

To further show how this conserves fuel, if instead of operating at atmospheric pressure on butane under a dilution of 6 volumes of steam, I operate at the equivalent of ¼ atmosphere absolute and a dilution of 0.75, I decrease greatly the quantity of steam required, which makes a small boiler unit 97 quite suitable, and I decrease the fuel demand for heating the feed. These two items, both of which are large, make it possible to save about one-third of the by-product fuel. Such a saving is well worth while, since the said excess fuel then can be applied to a gas engine for obvious power requirements of the process. By reducing the volume of diluent required, I can also use a more expensive diluent such as mercury which forms no carbon monoxide.

I have shown in the preceding some advantages of applying reduced pressure to my process: as for instance reduction in losses due to carbon monoxide by using less or better diluent, reduction of cost following thereon, supplemented with self-regeneration of diluent and preheating of air for further economy. I have yet, however, to present further important results of the reduced pressure procedure, involving novel methods for securing increased yield from the feed.

I crack at reduced pressure within the tube 24 of Fig. 1 in order to gain the benefits of a decreased residence period, for I find that reduced pressure decreases the pressure differential required to keep the stream in flow, which is no doubt explained by the elimination of part of the diluent vapor. Accordingly, I can then speed the stream through at a higher velocity, either by increasing the rate, or by decreasing the gas path section and correspondingly increasing the area ratio. The effect of reduced pressure is of such magnitude in this respect, that the pressure differential at a given rate of flow of feed is reduced in proportion to the absolute pressure. As a result, the residence period may be reduced such that at ½ atmosphere pressure it may be 70% as great as at atmospheric pressure, while at ¼ atmosphere absolute, it is about half as great as at atmospheric pressure. From these relations it may readily be determined what is the effect of reduced pressure of any given value within which I operate, on differential tube pressure, residence period or area ratio. The magnitude of these effects then may be applied to the limits in the above mentioned patents (or as set out in the copending Hasche applications of even date) as to atmospheric pressure operation, for establishing specific numerical limits with reduced pressure. In my process, residence period is generally less than .05 second and in many instances substantially less than .001 second, in the tube 24 of Fig. 1.

The much increased velocity possible with feed at lower pressure, reflects its advantages also in the problem of conveying cracked mixtures to the air preheater 89 to be chilled. Rapid chilling is effected by a decreased time limit on passage of cracked mixture from the cracking tube to the air preheater, together with a high velocity possible in the nest of small bore tubes in the heater.

I have discovered also that residence period per foot length of cracking tube tends to be smaller in the hottest portion of the tube, when operating at reduced pressure, than it is when operating at atmospheric pressure or higher, due to an additional entirely different cause. Expansion of fixed gas from butane in the preheated feed may be about 2.5, and on cracking, this value increases to about 3.7. A good part of the secondary expansion occurs in the hottest part of the tube, and is reflected in a decreasing density, accompanied with an appreciable increase in the effective volume of gas at that point. Since the pressure remains constant at a given point, there is accordingly an increase in speed of the stream through the tube at that point.

Of course the same secondary or chemical expansion occurs when operating at atmospheric pressure, but it is masked to some extent by the diluent. An illustration will show clearly the difference, if I compare butane at a dilution of 6 at atmospheric pressure, with butane at a dilution of 0.75 at ¼ atmosphere pressure. With the former there is an effective increase in volume from 8.5 to 9.7, while with the latter, the effective increase in volume is from 3.2–5.4. The first case shows an increase of 14%, while the latter shows an increase of 37%. The latter, in short, is of a magnitude to affect very favorably the residence period of the hottest part of the tube, and, as has been pointed out above, the tenacity is correspondingly decreased, permitting the increase of speed to occur with little or no increase in differential pressure forcing the flow. I find it of much value that the residence period is differentially favored thus in the hottest part of the tube for it accomplishes to some extent what I have already disclosed, namely, progressively reducing the gas path section toward the hot end of the tube.

In fact, this expedient leads to another device I have developed, not only for applying heat with greatly increased effectiveness, but for increasing materially further the speed of the stream and consequently decreasing proportionately the residence period there.

Fig. 6 shows a vertical partial section of the upper end of the cracking tube as modified in a fashion that will accomplish these valuable ends. As already indicated, 29 is a fitting that receives the cracked gases from tube 123 while 113 indicates the corebuster; 42 is the furnace wall and 25 is the burner shown in action. The tube may be made of carborundum or other suitable materials. At 122 are shown perforations in the tube that admit while hot burner vapors of flue gas into the cracking chamber preferably at or slightly below the level of the burner 25. By this means is the highest temperature made available in the last effort to increase the yield of acetylene, while at the same time the added volume of flue gas immediately hurries the stream out of the cracking tube. It is clear from the action here seen to be desired, that preferably I seek the most rapid and uniform blending of the flue gases admitted, and accordingly declare that the perforations should be suitably designed as to number, shape and disposition in the tube wall.

It should be observed that this device for heating removes from the problem the barrier of a wall. Outside the tube is a gas, several hundred degrees hotter than the materials within, permitting a final temperature in the tube stream up to 1700° C. It is not as though materials in the tube became excessively contaminated with flue gas. To secure considerably increased yields of acetylene requires a relatively small temperature rise available with a rather limited proportion of hot flue gas injected within my novel method. Particularly is this device for direct heating made valuable by the expedient of preheating air (as shown in Fig. 1), which renders the temperature at this point considerably higher, reducing further any gas contamination and augmenting acetylene yield further.

Obviously the proportion of flue gas to feed is controlled as for instance by giving the perforations 122 a suitable total area of discharge in view of the measure of reduced pressure in tube 123 and temperature and tenacity of the flue gas passed. I am also mindful that a certain measure of residual combination is still apt to be proceeding in the gases entering the cracking chamber through perforations 122. However, this may supply additional advantages, since the said gases entering, contribute heat of reaction to some extent in lieu of just specific heat. In this way the contamination becomes less and the temperature higher. According to the efficiency with which the several steps above are carried out, I may wish to admit into the cracking chamber flue gas at a rate of flow about up to one-half of the sum of the C. F. M. values of the cracked gas plus diluent. For instance, if I am operating at atmospheric pressure with butane at a dilution of 6, assuming a rate of flow for butane of one C. F. M. the C. F. M. for cracked mixture is about $6+3.7=9.7$, so the flue gas may be $9.7/2=4.8$. If I am operating at one-fourth atmosphere with butane and a dilution of .75, the C. F. M. for cracked mixture is about $.7+3.7=4.4$, so the flue gas may be as much as 2.2.

It is to be observed that in the first case the addition of flue gas may even exceed that of cracked gas, whereas in the second case the addition of flue gas at the maximum is only minor. When the rate of addition of flue gas becomes high, I may choose to admit it through a section of porous body in the wall of the tube 123, to the end of improving the rate of mixing, while at the same time equalizing the thermal strains on the tube that would result from the perforations 122 when handling much gas. This novel way of admitting the flue gas is fundamentally sound since in addition it provides a structure that stands more thermal differences than a solid wall tube.

Thus ordinarily, as for instance when working at dilutions of about 6 based on atmospheric pressure, I find ¼ atmosphere suitable for reduced pressure operation. But as I work up to dilutions of 18 at atmospheric pressure, I may elect to match this with an equivalent of up to about $\frac{1}{16}$ atmosphere absolute, still preferably retaining a little diluent.

Such a tube structure demands something of a vertical distribution of entering flue gas, which I may well desire. For not only does it permit most intimate mixing of flue gas with the stream in the tube, but the manner of entry of the very hot flue gas most effectively heats the tube itself, distributing the heat still further. And it should be noted that in any case, since the lower end of the tube 112 is never appreciably above atmospheric pressure, there is no loss of diluent to increase cost of operation.

I am aware that there are processes which teach making acetylene from hydrocarbon vapors by incomplete combustion thereof, or by burning air in a hydrocarbon vapor, and in fact, I endeavored many years ago to see my way to the development of a process on those principles. But the difficulty always resulted, of excessive dilution of the cracked gas with nitrogen or carbon monoxide or dioxide. The device that I apply here is but an important auxiliary to a tube-cracking process, wherein I prevent most of the dilution by applying it only at the point of highest need, and only under reduced pressure so that the need may be smaller still. Further, I do not rely on the raw material for combustion, but use that of the fuel itself. Even if the flue gas is still burning when it reaches the tube stream, it is burning within itself, and does its work that way. And also, if it is burning, it is only the second stage, that of carbon monoxide to dioxide, that would possibly be in action at that time. For as is well-known in the combustion of hydrocarbons, the first to burn is carbon to monoxide, then hydrogen, while last is combustion of carbon monoxide to dioxide. I may, indeed, prefer that the combustion be completed within the pores that admit the flue gas, so that the tube itself secures the materially higher temperature with which to treat the tube stream as desired.

I wish to declare, further, that it is most advantageous to use a fuel of high hydrogen content, first because hydrogen has a very high speed of combustion, thus localizing the heat as I wish, and second because it furnishes then a high component of water vapor in the flue gas, which afterwards is condensable, as for instance in the boiler 97 of Fig. 1. This becomes a very appreciable item, especially at higher absolute pressures in the cracking tube.

Next to hydrogen, I prefer methane as a constituent of the fuel, since it has a low carbon content, and a high hydrogen content. And having thus declared the value of hydrogen and methane, I find that my stripped gas fuel is admirably suited for flue gas in my step of mixing with the tube stream. For the stripped gas has an analysis of approximately 57% hydrogen, 38% methane, and 5% carbon monoxide. Analysis of stripped gas will vary somewhat with conditions of operation of my process, but has in any event a higher content of hydrogen than of methane, and when I recirculate olefins, particularly ethylene, the stripped gas from methylene will contain about 90% hydrogen. Thus is the stripped gas further improved for these uses.

In regard to terminology, temperature registered in the apparatus during each test is recorded in degrees Centigrade, as are all records of temperature herein. Butane, ethylene, and steam used for dilution, are all measured in standard cubic feet, and rates of flow in cubic feet per minute, for convenience abbreviated C. F. and C. F. M. So for all primary and secondary stock and any diluent herein, a standard cubic foot of gas represents the quantity of gas in such a volume at 25° C. and one atmosphere absolute pressure, and will so be understood herein. The weight of such a volume of a given gas or gas mixture, is assumed to be equal to the molecular weight, or average molecular weight, in pounds, divided by 384. And while steam is, of course, non-existent in those conditions, still the hypothetical volume is herein computed by extrapolation as though it did exist, and behaved like a fixed gas such as nitrogen. In order to establish without possible doubt the meaning of one standard cubic foot of steam, it will be assumed herein that such a unit of steam weighs 18/384=0.0468 pound avoirdupois, arrived at exactly as for gases. The same formula is herein to be applied to other diluents and other normally liquid substances according to their molecular weights. The care exercised in this paragraph in establishing units and factors of conversion is for eliminating any possible confusion, and to the fact that for purposes of testing variables relating to my process, it is better to speak in terms of volumes rather than weights, while for purposes of elucidating economies, the converse practice is more convenient.

Dilution or extent of dilution is expressed as the ratio of rate of flow of diluent to that of stock being cracked, each expressed in C. F. M. The term "expansion" signifies the number of cubic feet of cracked gas formed from one cubic foot of stock cracked. Gas analysis is given in percent by volume. Conventions developed in this paragraph will be used through herein, except that "expansion" in preheater tests may at times refer to fixed gas resulting from preheating rather than to cracked gas, as will be clear in context.

Hereinafter the said period of heating has been and will be termed residence period, and will be understood to be the length of time in seconds that a given portion of gas, whether in stream or static, is undergoing a particular unit heat treatment, remains in the unit giving that treatment. For instance, the residence period for feed being preheated in the preheater 16 of Fig. 1, is that number of seconds during which an element of the feed remains in the coil 17 or the coil 17 plus the reaction chamber 66 as the case may be.

The following example is set forth for illustrating the application of my invention to the manufacture of acetylene from a saturated hydrocarbon such as butane or isobutane. It is to be understood that this example is merely set forth for illustrating my preferred embodiment, hence, is not to be construed as limiting my invention. The saturated hydrocarbon would be fed from tank 1 through conduit 2 to the junction 11. At 11 the hydrocarbon is mixed with a small amount of steam in a dilution ratio less than about 3. Some steam is preferably employed because it serves to keep the apparatus clean of carbon and the like as well as act as a diluent. However, as apparent from the preceding description, various other diluents might be employed such as, for example, carbon dioxide. In case of steam, this diluent may have been preformed either in an apparatus (not shown) or in the vaporizer 97, the function of which has already been fully set forth.

The mixture of saturated hydrocarbon and steam may also contain an addition of ethylene or other olefin supplied through meter 59. This addition may, of course, have been recirculated by means of pump 84 or may be obtained from some other source. The final feed mixture of these various components is preheated at a temperature between 700° C. and 1000° C. for less than 1.0 second and preferably between about 0.5 second and 0.1 second.

The preheated mixture then passes into pyrolysis tube 24 where it is further heated. The heating in this tube may be to a temperature of between about 1150° C. and 1400° C. for less than about 0.05 second. As already fully discussed, the pyrolysis is conducted under reduced pressure of less than about 0.5 atmosphere absolute.

It is also apparent that in either the preheating step or the pyrolysis step the cross-section of the gas path may be rendered non-uniform by inserting tapered corebusters in the tubes or by employing corebusters of varying sizes or even by tapering the tubes themselves. Preferably, if such a non-uniform cross-section is employed, the narrowest cross-sections will be those exposed to the highest temperatures. In this manner the velocity of the gas passage is increased at the hottest points, and residence period decreased.

As also pointed out, if desired, a certain portion of the hot flue gases may be allowed to pass through perforations in the cracking tube and thereby directly heat the gases being cracked.

The materials are preferably treated in the preheater so as to obtain a gas expansion between about 1.5 and 2.5 and in the pyrolysis tube 24 to obtain a gas expansion between about 2.2 and 3.7. It is also preferred that the resultant gas mixture issuing through fitting 29 contain not only acetylene but also a substantial content of ethylene.

The gas mixture containing acetylene and ethylene is then cooled to about 100° C. by means of passage through the nest of tubes in 89 over which is blown air, as already described. The cooled acetylene and ethylene containing mixture may then be subjected to the various operations of filtering, scrubbing, compression and the like for separation and recovery of the desired components. It is, of course, understood that these various steps of filtering and scrubbing are to some extent optional and may be supplemented or modified. The acetylene produced and separated may be employed for any of the usual purposes or the acetylene might be reacted directly in towers 48 or 51 for producing various other chemical compounds. As indicated, preferably the ethylene and in some instances other components of the gaseous mixture may be recirculated.

It is, of course, possible to withdraw ethylene through valve 64 and conduct it to chemical reactions or other uses.

While I have described my invention as in particular applied to the treatment of saturated hydrocarbons, such as butane, it is apparent from my prior patents already referred to that various other hydrocarbons may be treated. It is also apparent from the preceding description that my invention is susceptible of modification. For example, in place of perforations, it is possible to some extent to make the tube porous, thus effecting combustion heating of the tube wall within it and avoiding the problem of heat transfer therethrough. While I have shown the use of a metal preheater tube and a carborundum cracking tube, it is possible to employ other constructions. I may use especially adapted metal or other metal alloys in relatively thin gauge which I coat externally or internally or both with a vitreous enamel of high softening point. In lieu of enamel externally, I may form an adherent oxide from one or more of the elements in the metal wall. Instead of enamel, I may carbidize one or more of the surfaces. I find that metal tubes used in conjunction with my reduced pressure process function quite satisfactorily. It is also possible to employ zirconium silicate in the construction of tubes and other parts of my process.

From a consideration of the preceding, it will be observed that I have developed a novel apparatus particularly adapted for carrying out my reduced pressure process. Therefore, it is understood that I do not wish to be restricted in my invention excepting insofar as is necessitated by the prior art and the spirit of the appended claims.

What I claim and desire to secure by Letters Patent of the United States is:

1. A process for the manufacture of acetylene, which comprises mixing a saturated hydrocarbon with a small amount of water vapor and an olefine, preheating the resultant mixture to a temperature in excess of 700° C. but less than 1100° C. for a period sufficient to cause some gas expansion but for less than five seconds, pyrolyzing the preheated mixture at between 1150° C.–1400° C. in a pyrolysis zone maintained under less than 0.5 atmosphere pressure by evacuation thereof, supplying at least a part of the pyrolysis heat by means of the combustion of fuel containing a substantial amount of hydrogen, with preheated air, cooling the acetylene-containing gases by means of heat exchange with incoming combustion air, to a temperature insufficient to condense water vapor, increasing the pressure on the mixture to condense water vapor therefrom, and employing the heat of condensation for generating further water vapor, recovering acetylene and olefines from the gas, thereby leaving a residual gas containing a high content of hydrogen.

2. A process for the manufacture of acetylene, which comprises subjecting a mixture of diluent and materials at least in part capable of forming acetylene and olefines, to combustion heat, conducting the heating at temperatures between about 1150° C. and 1400° C. for a time of less than .05 second, said heating being further characterized in that at least a part of the hot combustion products are brought into direct admixture with the materials being heated just prior to the withdrawal of said materials to cooling, the products being admitted into admixture at a C. F. M. not greater than one-half the C. F. M. of the materials except diluent being heated, withdrawing, rapidly cooling, and recovering acetylene from the products obtained.

3. A process for the manufacture of acetylene in the presence of materials containing greater than 2% nickel, which comprises diluting the feed materials with steam in a dilution ratio less than 3.0, subjecting the diluted mixture to preheating at less than atmospheric pressure, and at temperatures between about 700° C. and 1000° C. for less than 1.0 second, further heating the preheated mixture at 200° C.–600° C. higher temperatures for a shorter period of time under a partial vacuum induced by an evacuation, and rapidly cooling the acetylene-containing gases formed.

4. A process for the manufacture of acetylene, which comprises subjecting saturated hydrocarbon materials suitable for forming acetylene and olefines to combustion heating, conducting the heating at temperatures between about 1000° C.–1700° C. for less than .05 second, said heating being further characterized in that at least a part of the combustion products, after the combustion materials have substantially completely burned, are brought into direct admixture with the materials being heated substantially immediately before said materials are withdrawn from said heating to cooling, withdrawing acetylene containing materials, rapidly cooling the withdrawn materials and recovering acetylene from the cooled materials.

5. A process for the manufacture of acetylene from hydrocarbon feed material containing sulphur compounds which reduce acetylene yields, which comprises diluting the sulphur containing feed materials with steam in a dilution ratio less than 3, subjecting the diluted mixture to preheating at temperatures between about 700° C. and 1000° C. for less than 1.0 second, further heating the preheated mixture at higher temperatures, 200° C.–700° C. above the temperature employed in the preheating, for a shorter period of time under a reduced pressure, induced by an evacuation, of less than 0.5 atmosphere, and rapidly cooling the acetylene-containing gases formed.

6. A process for the manufacture of acetylene, which comprises diluting a hydrocarbon material capable of forming some acetylene and olefines with a diluent vapor, subjecting the mixture to treatment including pyrolyzing the mixture under an absolute pressure of less than 0.5 atmosphere at temperatures between 1150° C. and 1400° C. for less than 0.05 second to obtain a gas mixture containing acetylene and diluent, substantially chilling the pyrolysis mixture but not to a point that condenses the diluent, pumping the chilled diluent from the chilling step, increasing the pressure on the chilled diluent to cause condensation thereof, discharging the compressed diluent into a boiler wherein some diluent vapors are generated by the latent heat from the condensing diluent, employing at least a part of these diluent vapors for the aforementioned step of diluting a hydrocarbon material with a diluent vapor.

ROBERT G. WULFF.